B. A. LINDERMAN.
CARRIER MECHANISM FOR LUMBER JOINING MACHINES.
APPLICATION FILED MAY 10, 1909.

929,232.

Patented July 27, 1909.

2 SHEETS—SHEET 1.

Witnesses
Frank J. Blanchard

Inventor
Bert A. Linderman
By Munday, Evarts, Adcock & Clarke
Attorneys

B. A. LINDERMAN.
CARRIER MECHANISM FOR LUMBER JOINING MACHINES.
APPLICATION FILED MAY 10, 1909.
929,232.
Patented July 27, 1909.
2 SHEETS—SHEET 2.
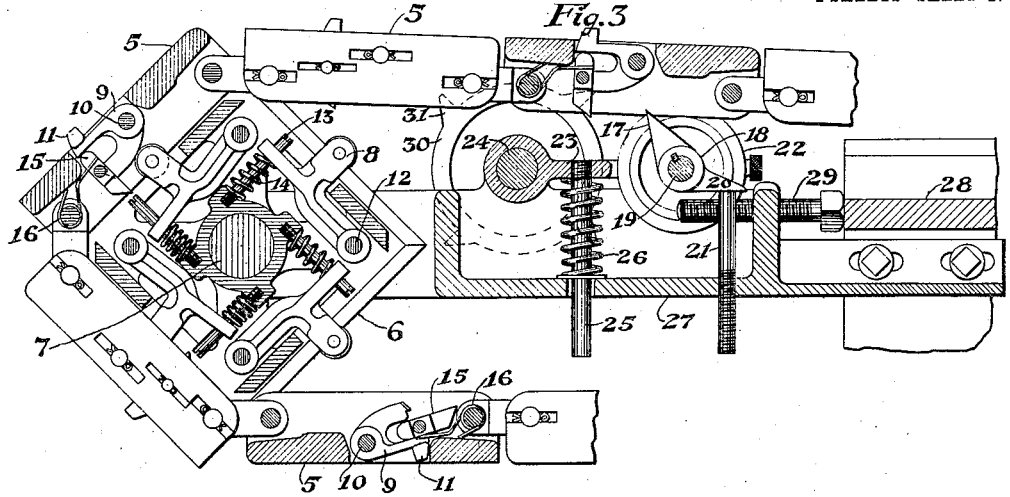
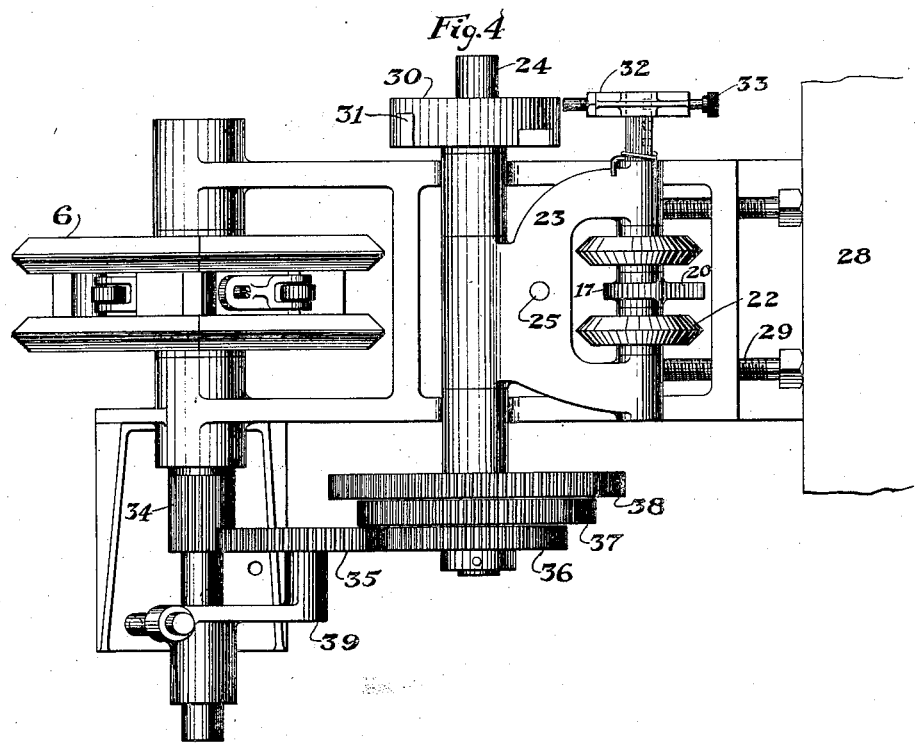
Witnesses
Frank K. Blanchard
Inventor
Bert A. Linderman
By Munday, Evarts, Adcock & Clarke
Attorneys

UNITED STATES PATENT OFFICE.

BERT A. LINDERMAN, OF MUSKEGON, MICHIGAN.

CARRIER MECHANISM FOR LUMBER-JOINING MACHINES.

No. 929,232.     Specification of Letters Patent.     Patented July 27, 1909.

Application filed May 10, 1909. Serial No. 495,119.

*To all whom it may concern:*

Be it known that I, BERT A. LINDERMAN, a citizen of the United States, residing in Muskegon, in the county of Muskegon and State of Michigan, have invented a new and useful Improvement in Carrier Mechanism for Lumber-Joining Machines, of which the following is a specification.

This invention relates to the construction of the carriers used for feeding the stock in lumber-joining machines employing two oppositely moving carriers, in combination with cutters for cutting interfitting dovetails on the proximate edges of two pieces of lumber, and then acting to bring them together by an endwise movement in which dovetails are carried into engagement. A machine of this general character is shown in the patent granted in the United States to Albert T. Linderman, on the 7th of August, 1906, and numbered 827,379. The present invention is an improvement upon the carriers shown in said Linderman patent, and intended to remove some of the difficulties attending the use of the said patented construction.

The nature of my improvement and its mode of operation are set forth in the description given below, and will also be understood from the accompanying drawing, in which latter—

Figure 1:
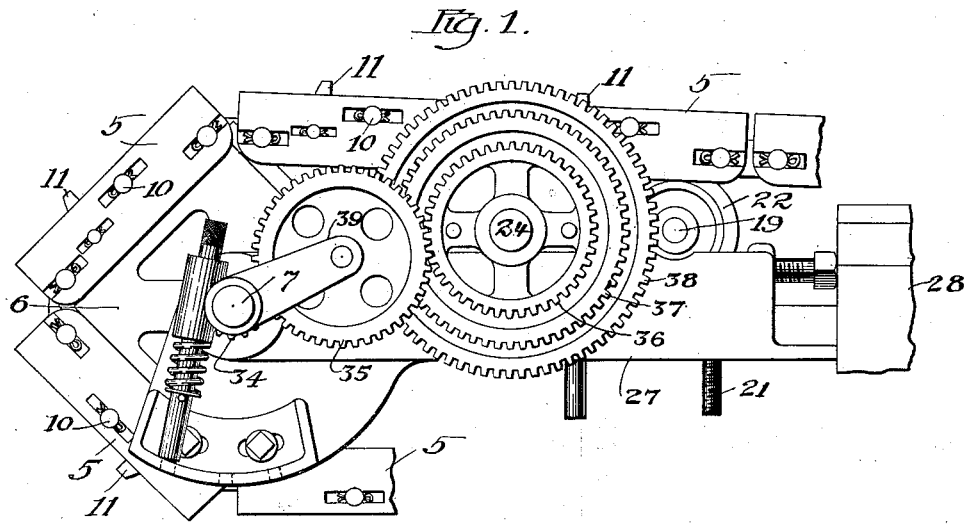
Figure 2:
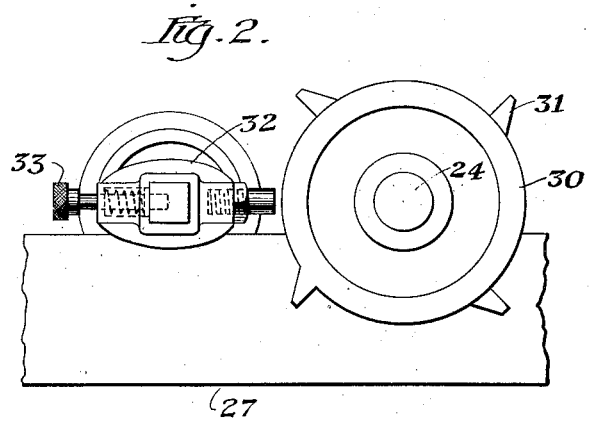

Figure 1 is a partial side elevation of the carrier mechanism of a lumber joining machine embodying my invention. Fig. 2 is a detail elevation of a part of the mechanism. Fig. 3 is a longitudinal, vertical section of the parts shown in Fig. 1, partly broken away, and Fig. 4 is a plan of the carrier supporting mechanism, the carrier itself being omitted.

In said drawing, 5, 5 represent the sections or carriages which are coupled together and form one of the endless carriers of the lumber joining machine. They pass around and may be operated by four sided wheels, one of which is shown at 6 and is mounted upon a cross shaft 7. Each carriage contains a U-shaped lever or device 9, pivoted at 10, and carrying at the end of their upper limbs the dogs 11 adapted to act as pushers of the lumber which rides upon the carrier. The normal position of the device 9 is illustrated in the case of the lowermost carriage in Fig. 3, and in it the dog 11 is shown as withdrawn entirely within the carriage so that it cannot act on the lumber. It is released from this position however while riding on wheel 6 and is then allowed to move to the position shown in the case of the two uppermost carriages which are sectioned in Fig. 3, and in which its dog is returned into acting position, by devices located within the wheel 6, and provided upon each of its four sides. These devices consist of lifters 8 projecting from the sides of the wheel, and adapted to enter the carriages while they are riding on it. These lifters are T-shaped, and pivoted at 12 at the outer end of one of its limbs, and the outer end of the other limb encircles a guide 13 projecting from the hub of the wheel and having a spring 14 coiled around it and bearing upwardly against the lifter as will be understood from Fig. 3. The lifters act on the dog carrying levers of the carriages while riding on the wheel and press them upward so as to carry the dog into acting position. And in so doing the trigger 15 which is pivoted to the side of the carriage 5 and normally lies lengthwise in the crotch of lever 9, as shown in the lowermost carriage of Fig. 3, is released so that its spring 16 can force it to an upright position shown in the uppermost carriage of said figure. In this changed position the top of the trigger sets under the upper limb of the lever 9 and supports it, while its lower end projects below the carriage and into the plane of action of a tripping arm 17 secured to a hub 18 on the shaft 19. By the tripper 17 the trigger is swung back to its horizontal position within the lever 9 and the latter is returned to its nonacting position and continues in this position until it again rides on the wheel 6. The tripper is located close to the wheel so it will act on the triggers soon after the carriages move off the wheel. Said hub has a second arm 20 adapted to act with a vertical set screw 21, in adjusting the tripping arm. The tripper and its hub are located between supporting rollers 22 having V-shaped peripheries supporting the carrier, and the shaft 19 is supported in a frame 23 swinging on cross shaft 24 and yieldingly supported adjacent to the shaft by a pin 25 and coiled spring 26. The frame member 27 in which shaft 24 and other parts just described, are mounted, is bolted to and adjusted from a cross member 28 of the main frame by screws 29, and by this adjustment the carrier is tightened from time to time as needed.

As will be understood, the stock is frequently longer than the carriages, and consequently the dogs of some of the latter are not needed for feeding purposes, and it is desirable that such dogs should be kept in their retracted positions. For this purpose I place a governor 30 on the shaft 24, and provide it with a number, preferably four, of projecting teeth 31 of different widths, and these teeth are adapted to engage with an arm 32 mounted on the shaft 19, and secured on the squared end of said shaft by a spring catch 33, and by such engagement, to rock the shaft 19 so as to carry the tripper arm 17 below the plane of the triggers and prevent it from operating them. As the teeth 31 are of different widths, some of them may fail to operate the trip arm, depending upon the position of the trip arm. The trip arm is adjusted on its shaft in order to prevent the operating of any desired number of triggers. Thus with the aid of the differential gears 36, 37 and 38 hereinafter mentioned it may be set so as to cause the tripper to operate every trigger, or only every third, or fourth or fifth, or sixth, or eighth, or tenth, or twelfth or twentieth one. The shaft 24 is actuated by a long gear 34 on the shaft 7, and an intermediate gear 35 is used to carry power to the differential gears 36, 37 and 38 on shaft 24. The intermediate gear is mounted on an arm 39 permitting it to be swung and shifted so it may mesh with either of said gears as desired. The gears vary in size, so that the speed of the shaft 24 may be changed, and thereby change the intervals at which the governor operates the arm 32.

I claim:—

1. The carrier for lumber joining machines, composed of carriages, provided with retractable dogs for feeding the lumber, a wheel over which the carrier moves and by which the dogs are raised to acting position, devices adjacent to the wheel for causing the retraction of the dogs, and governing devices selectively controlling the action of the retracting devices.

2. The carrier for lumber joining machines, composed of a series of carriages linked together and each provided with a retractable dog for feeding the lumber, a wheel over which the carrier moves and by which the dogs are raised, means adjacent to the wheel adapted to cause the retraction of all the dogs, and governing devices controlling the retracting means so that the dogs which are needed for feeding the stock being joined are not retracted.

3. The carrier for lumber joining machines, composed of a series of carriages linked together and each provided with a retractable dog for feeding the lumber, and a trigger by which the dog may be retracted, a wheel over which the carrier rides and by which the dogs are raised, a tripping device adjacent to the wheel adapted to operate the triggers, and governing devices controlling said tripping device and preventing the retraction of the dogs which are needed to feed the lumber being united.

4. The carrier for lumber joining machines, composed of a series of carriages linked together and each provided with a retractable dog for feeding the lumber, and governing devices consisting of triggers carried by the carriages, a tripping device engaging the triggers, and a governing wheel controlling the action of the tripping device.

5. The carrier for lumber joining machines, composed of a series of carriages linked together and each provided with a retractable dog for feeding the lumber, a wheel over which the carrier moves and by which the dogs are raised, means adjacent to the wheel adapted to cause the retraction of all the dogs, and adjustable governing devices controlling the retracting means so that only the dogs needed are retained in action.

BERT A. LINDERMAN.

Witnesses:
W. P. MARSHALL,
A. B. COOK.